(12) United States Patent
Park et al.

(10) Patent No.: US 9,497,635 B2
(45) Date of Patent: Nov. 15, 2016

(54) METHOD AND APPARATUS FOR ACCESSING INITIAL CHANNEL IN WIRELESS LAN

(71) Applicant: LG ELECTRONICS INC., Seoul (KR)

(72) Inventors: Giwon Park, Seoul (KR); Kiseon Ryu, Seoul (KR); Jinsam Kwak, Seoul (KR);
(Continued)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/426,338

(22) PCT Filed: Sep. 11, 2013

(86) PCT No.: PCT/KR2013/008233
§ 371 (c)(1),
(2) Date: Mar. 5, 2015

(87) PCT Pub. No.: WO2014/042437
PCT Pub. Date: Mar. 20, 2014

(65) Prior Publication Data
US 2015/0230093 A1 Aug. 13, 2015

Related U.S. Application Data

(60) Provisional application No. 61/699,817, filed on Sep. 11, 2012, provisional application No. 61/700,859, (Continued)

(51) Int. Cl.
*H04W 12/08* (2009.01)
*H04W 48/16* (2009.01)
(Continued)

(52) U.S. Cl.
CPC .............. *H04W 12/08* (2013.01); *H04W 48/16* (2013.01); *H04W 48/20* (2013.01);
(Continued)

(58) Field of Classification Search
None
See application file for complete search history.

(56) References Cited

U.S. PATENT DOCUMENTS

2005/0278735 A1* 12/2005 Boothe .............. H04N 7/17318
725/34
2007/0123254 A1* 5/2007 Choi .................... H04W 24/00
455/434

(Continued)

FOREIGN PATENT DOCUMENTS

KR 10-2004-0048255 6/2004
KR 10-2007-0031817 3/2007
(Continued)

OTHER PUBLICATIONS

PCT International Application No. PCT/KR2013/008233, Written Opinion of the International Searching Authority dated Dec. 27, 2013, 1 page.

*Primary Examiner* — Ayaz Sheikh
*Assistant Examiner* — Faiyazkhan Ghafoerkhan
(74) *Attorney, Agent, or Firm* — Lee, Hong, Degerman, Kang & Waimey

(57) ABSTRACT

A method for accessing an initial channel by a STA can comprise the steps of: the STA receiving, via a first band from a multiband AP, a scanning frame comprising a neighboring AP information element, wherein the neighboring AP information element comprises information for a second band which is an operating band for the neighboring AP; the STA determining whether accessing the neighboring AP is possible on the basis of information comprised in the neighboring AP information element regarding an access
(Continued)

network type of the neighboring AP operating in the second band; if access to the neighboring AP is possible, the STA transmitting an association request frame to the neighboring AP via the second band, wherein the access network type can comprise information regarding an access permission type of a neighboring AP.

10 Claims, 19 Drawing Sheets

(72) Inventors: Yongho Seok, Seoul (KR); Hangyu Cho, Seoul (KR)

Related U.S. Application Data filed on Sep. 13, 2012, provisional application No. 61/712,788, filed on Oct. 11, 2012, provisional application No. 61/765,038, filed on Feb. 15, 2013, provisional application No. 61/778,441, filed on Mar. 13, 2013, provisional application No. 61/781,004, filed on Mar. 14, 2013, provisional application No. 61/867,568, filed on Aug. 19, 2013.

(51) Int. Cl.
*H04W 48/20* (2009.01)
*H04W 72/04* (2009.01)
*H04W 84/12* (2009.01)
*H04W 88/08* (2009.01)

(52) U.S. Cl.
CPC ......... *H04W 72/0453* (2013.01); *H04W 84/12* (2013.01); *H04W 88/08* (2013.01)

(56) References Cited

U.S. PATENT DOCUMENTS

| | | | |
|---|---|---|---|
| 2007/0213012 A1* | 9/2007 | Marin | H04W 36/06 455/63.3 |
| 2008/0186914 A1* | 8/2008 | Na | H04W 92/20 370/329 |
| 2009/0323608 A1* | 12/2009 | Adachi | H04W 48/18 370/329 |
| 2011/0019653 A1* | 1/2011 | Seok | H04W 48/16 370/338 |
| 2011/0038357 A1* | 2/2011 | Gong | H04W 48/16 370/338 |
| 2013/0039200 A1* | 2/2013 | Park | H04W 16/14 370/252 |
| 2013/0039298 A1* | 2/2013 | Park | H04W 16/14 370/329 |
| 2013/0070644 A1* | 3/2013 | McCann | H04W 76/021 370/255 |
| 2013/0070738 A1* | 3/2013 | McCann | H04W 48/14 370/338 |
| 2013/0070739 A1* | 3/2013 | McCann | H04W 48/16 370/338 |
| 2013/0083762 A1* | 4/2013 | Adachi | H04W 48/18 370/329 |
| 2013/0142132 A1* | 6/2013 | Kim | H04W 52/367 370/329 |
| 2013/0142187 A1* | 6/2013 | Gong | H04W 48/16 370/338 |
| 2013/0177002 A1* | 7/2013 | Sun | H04W 48/12 370/338 |
| 2013/0230035 A1* | 9/2013 | Grandhi | H04W 48/16 370/338 |
| 2013/0235720 A1* | 9/2013 | Wang | H04W 28/0278 370/229 |
| 2013/0294354 A1* | 11/2013 | Zhang | H04W 72/04 370/329 |
| 2013/0318573 A1* | 11/2013 | Reunamaki | H04W 12/04 726/4 |
| 2014/0003361 A1* | 1/2014 | Song | H04W 16/14 370/329 |
| 2014/0010089 A1* | 1/2014 | Cai | H04W 48/16 370/241 |
| 2014/0010223 A1* | 1/2014 | Wang | H04W 76/021 370/338 |
| 2015/0208330 A1* | 7/2015 | Park | H04W 48/16 370/338 |
| 2015/0230093 A1* | 8/2015 | Park | H04W 12/08 726/4 |

FOREIGN PATENT DOCUMENTS

| | | |
|---|---|---|
| KR | 10-2008-0109799 | 12/2008 |
| KR | 10-2009-0054145 | 5/2009 |

* cited by examiner

METHOD AND APPARATUS FOR ACCESSING INITIAL CHANNEL IN WIRELESS LAN

CROSS-REFERENCE TO RELATED APPLICATIONS

This application is the National Stage filing under 35 U.S.C. 371 of International Application No. PCT/KR2013/008233, filed on Sep. 11, 2013, which claims the benefit of U.S. Provisional Application Ser. No. 61/699,817, filed on Sep. 11, 2012, 61/700,859, filed on Sep. 13, 2012, 61/712,788, filed on Oct. 11, 2012, 61/765,038, filed on Feb. 15, 2013, 61/778,441, filed on Mar. 13, 2013, 61/781,004, filed on Mar. 14, 2013, and 61/867,568, filed on Aug. 19, 2013, the contents of which are all hereby incorporated by reference herein in their entirety.

BACKGROUND OF THE INVENTION

1. Field of the Invention

The present invention relates to a method and an apparatus for accessing an initial channel, and more particularly, to a method and an apparatus for accessing an initial channel by a station (STA).

2. Related Art

In recent years, an evolution direction of a wireless LAN technique has been largely progressed into three directions. As an effort for further increasing a transmission speed on an extension line of the wireless LAN evolution direction in the related art, IEEE (institute of electrical and electronic engineers) 802.11ac and IEEE 802.11ad are provided. The IEEE 802.11ad is a wireless LAN technique using a 60 GHz band. Further, a wideband wireless LAN using a frequency band less than 1 GHz to enable wideband transmission distantatively rather than the wireless LAN in the related art has been come to the fore in recent years and includes IEEE 802.11af using a TV white space (TVWS) band and IEEE 802.11ah using a 900 MHz band. The wideband LANs mainly aim at extension of an extended range Wi-Fi service in addition to a smart grid and a wideband sensor network. Further, a wireless LAN medium access control (MAC) technique in the related art has a problem that an initial link setup time is significantly lengthened in some cases. An IEEE 802.11ai standardization activity has been recently in active progress in order for an STA to rapidly access an AP by solving the problem.

The standardization activity of the IEEE 802.11ai as an MAC technique that handles a rapid authentication procedure in order to epochally save an initial set-up and association time of the wireless LAN has been started as a legal task group in January 2011. In order to enable the rapid access procedure, the IEEE 802.11ai has discussed procedure simplification in regions such as AP discovery, network discovery, time synchronization function (TSF) synchronization, authentication and association, procedure merge with a higher layer, and the like. Among them, ideas including procedure merge using piggyback of a dynamic host configuration protocol (DHCP), optimization of a full extensible authentication protocol (EAP) using a concurrent IP, efficient selective access point (AP) scanning, and the like have been actively discussed.

SUMMARY OF THE INVENTION

The present invention provides a method for accessing an initial channel.

The present invention also provides an apparatus for accessing an initial channel.

In an aspect, a method for accessing an initial channel by a station (STA) is provided. The method includes: the STA receiving, via a first band from a multiband access point (AP), a scanning frame comprising a neighboring AP information element, wherein the neighboring AP information element comprises information for a second band which is an operating band for the neighboring AP; the STA determining whether accessing the neighboring AP is possible on the basis of information comprised in the neighboring AP information element regarding an access network type of the neighboring AP operating in the second band; and if access to the neighboring AP is possible, the STA transmitting an association request frame to the neighboring AP via the second band, and the access network type includes information regarding an access permission type of a neighboring AP.

In another aspect, a station (STA) which operates in a wireless LAN is provided. The STA includes: a radio frequency (RF) unit receiving a radio signal; and a processor selectively connected with the RF unit, and the processor is implemented to receive, via a first band from a multiband access point (AP), a scanning frame including a neighboring AP information element including information on a second band which is an operating band for the neighboring AP, determine whether accessing the neighboring AP is possible on the basis of information comprised in the neighboring AP information element regarding an access network type of the neighboring AP operating in the second band, and transmit, if access to the neighboring AP is possible, an association request frame to the neighboring AP via the second band, and the access network type includes information regarding an access permission type of a neighboring AP.

A scanning procedure can be rapidly performed.

DESCRIPTION OF EXEMPLARY EMBODIMENTS

Figure 1:
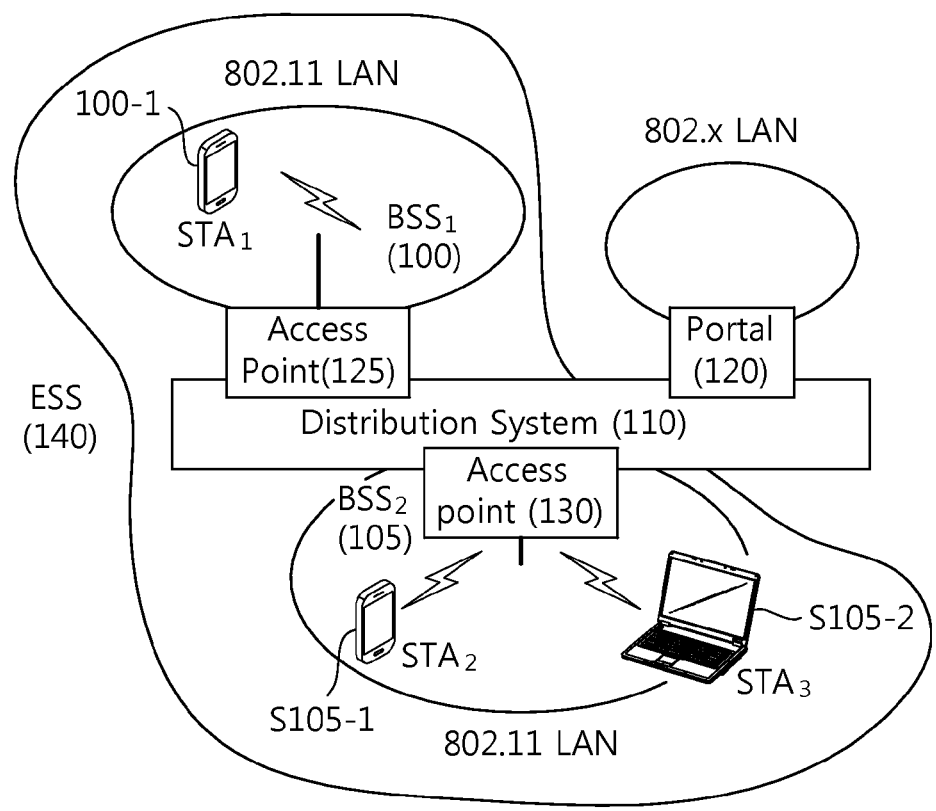
FIG. 1 is a conceptual diagram illustrating a structure of a wireless local area network (WLAN).
Figure 1:
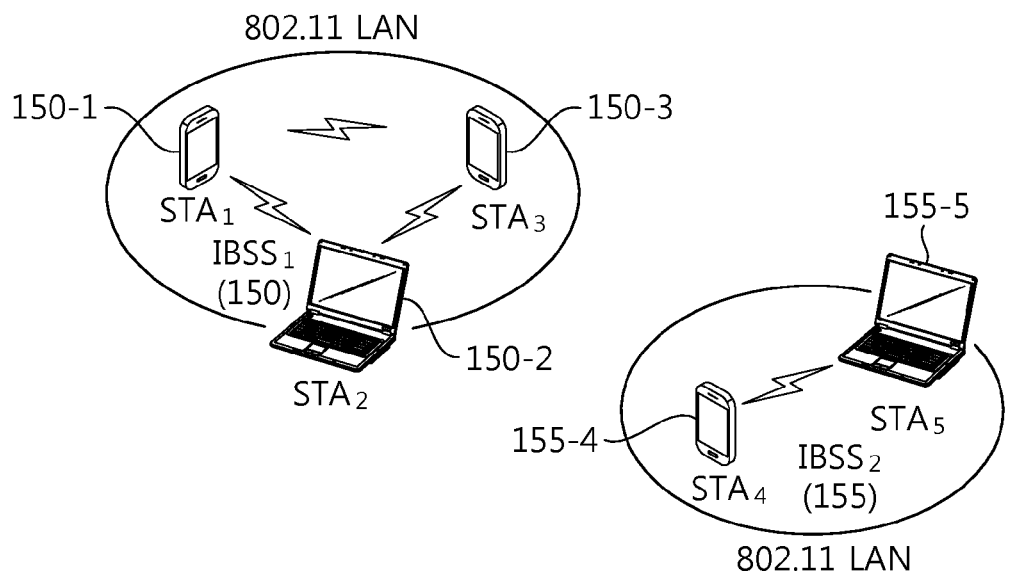

FIG. 1 is a concept view illustrating the structure of a wireless local area network (WLAN).

The upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

The lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4, and 155-5 are managed in a distributed manner. In the IBSS, all of the STAs 150-1, 150-2, 150-3, 155-4, and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
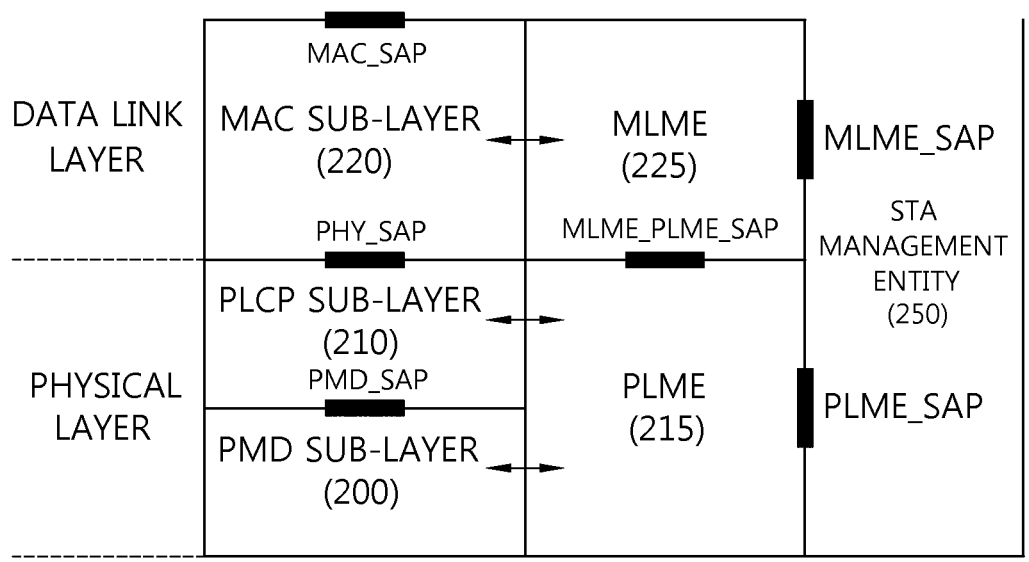
FIG. 2 is a diagram illustrating a hierarchical architecture of a wireless LAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
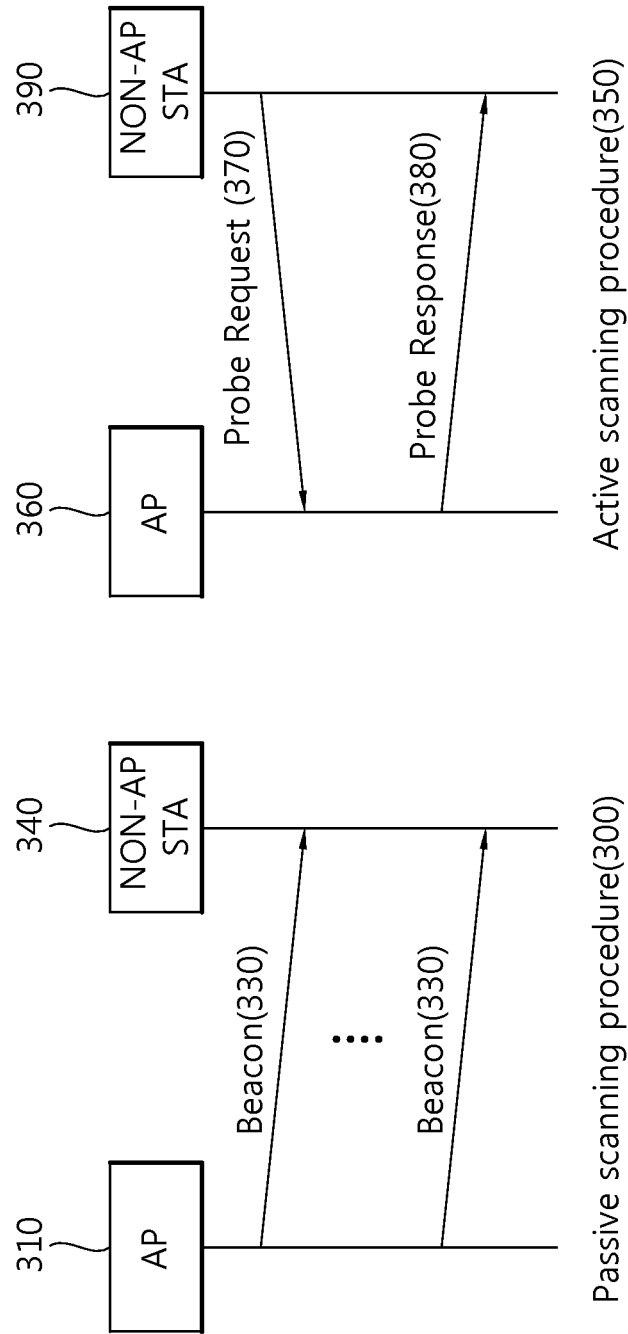
FIG. 3 is a conceptual diagram illustrating a scanning method in the wireless LAN.

FIG. 3 is a concept view illustrating a scanning method in a WLAN.

Referring to FIG. 3, the scanning method may be divided into passive scanning 300 and active scanning 350.

Referring to the left part of FIG. 3, the passive scanning 300 may be performed by a beacon frame 330 that is periodically broadcast from the AP 300. The AP 300 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, a fast initial link setup (FILS) discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID, BSSID) of an AP that transmits the FILS discovery frame. It may be implemented that the FILS discovery frame is transmitted to an STA before the beacon frame is transmitted, and thus, the STA may search that an AP is existed in the corresponding channel beforehand. An interval of which the FILS discovery frame is transmitted in one AP is referred to as an FILS discovery frame transmission interval. The FILS discovery frame may be transmitted with a part of information included in the beacon frame being included. The FILS discovery frame may also include information for a transmission time of the beacon frame of neighbor AP.

Referring to the right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
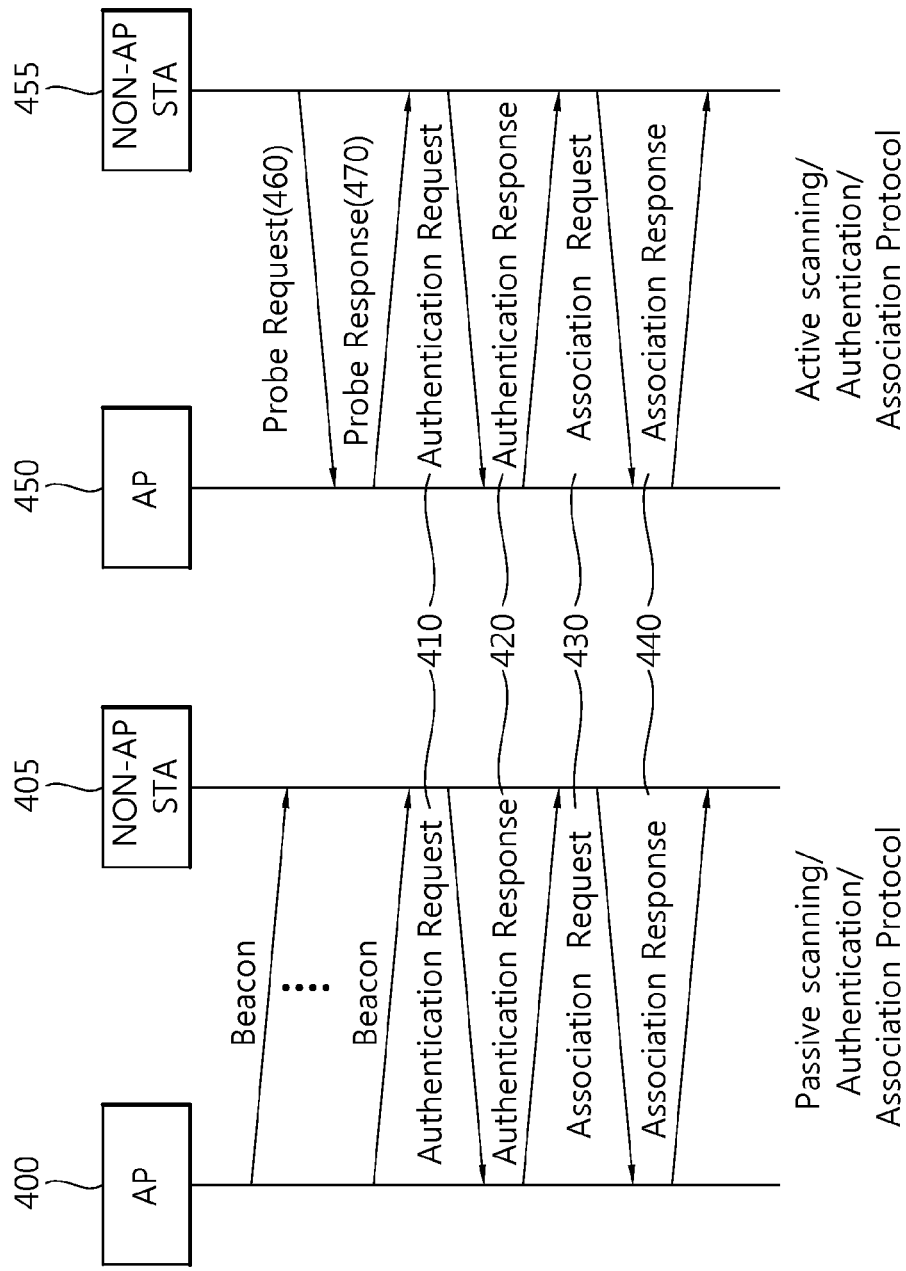
FIG. 4 is a conceptual diagram illustrating authentication and association processes after scanning by an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. The left part of FIG. 4 is a concept view illustrating an authentication and association process after passive scanning, and the right part of FIG. 4 is a concept view illustrating an authentication and association after active scanning.

The authentication and association process may be equally performed by exchanging an authentication request frame 410/authentication response frame 420 and an association request frame 330/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information on the capability of the non-AP STA 405 or 455. Based on the information on the capability of the non-AP STA 405 or 455, the AP 400 or 350 may determine whether the non-AP STA 405 or 355 may be supported. In case such support is possible, the AP 300 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
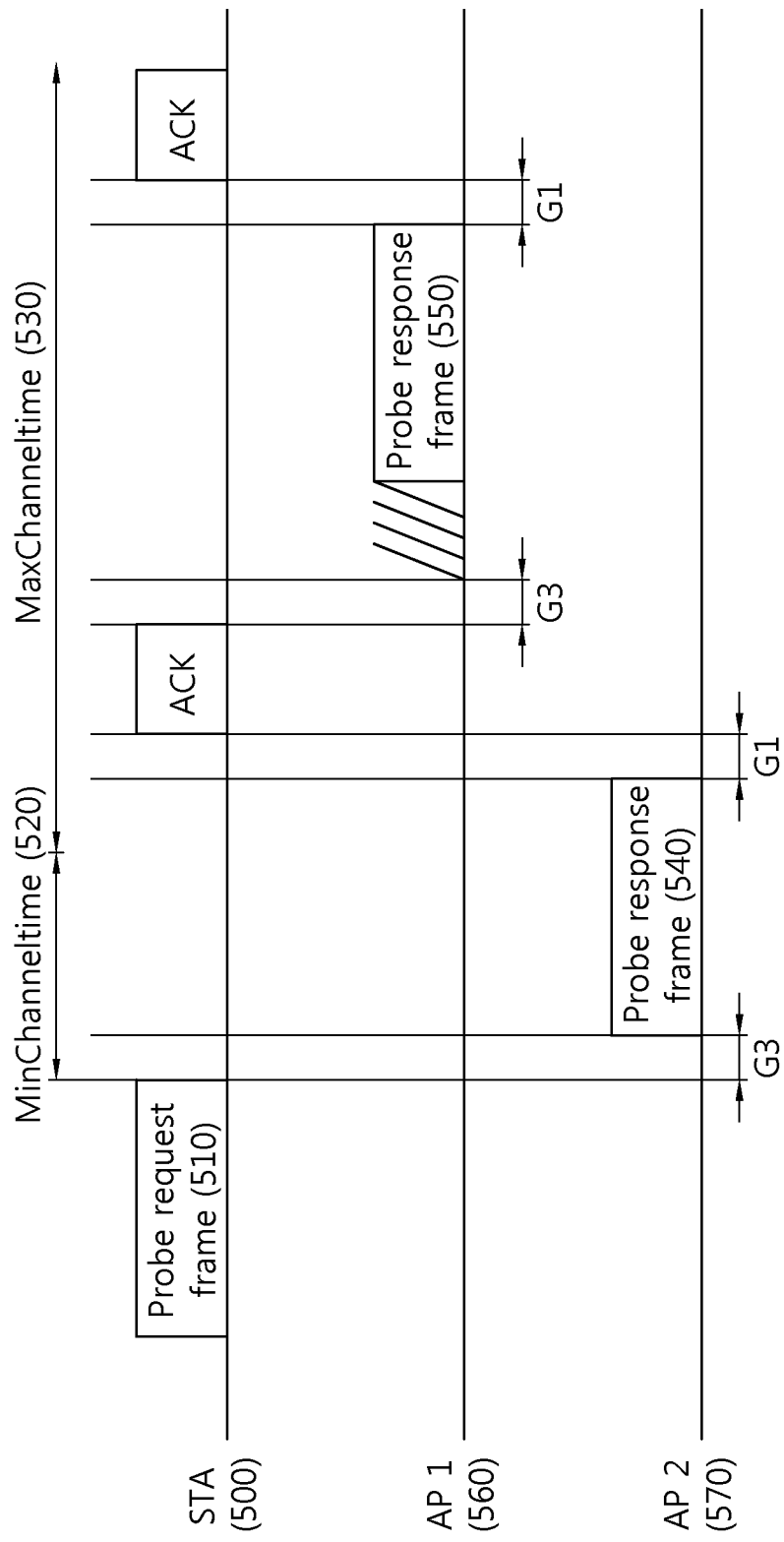
FIG. 5 is a conceptual diagram of an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RX-START.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until a probe timer reaches the minimum channel time 520, the STA 500 shifts scanning channels to perform scanning on other channel. In case the STA 500 receives the probe response frame 550 until the probe timer reaches the minimum channel time 520, it may process the received probe response frames 540 and 550 after waiting until the probe timer reaches the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the NAV (net allocation vector) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 6:
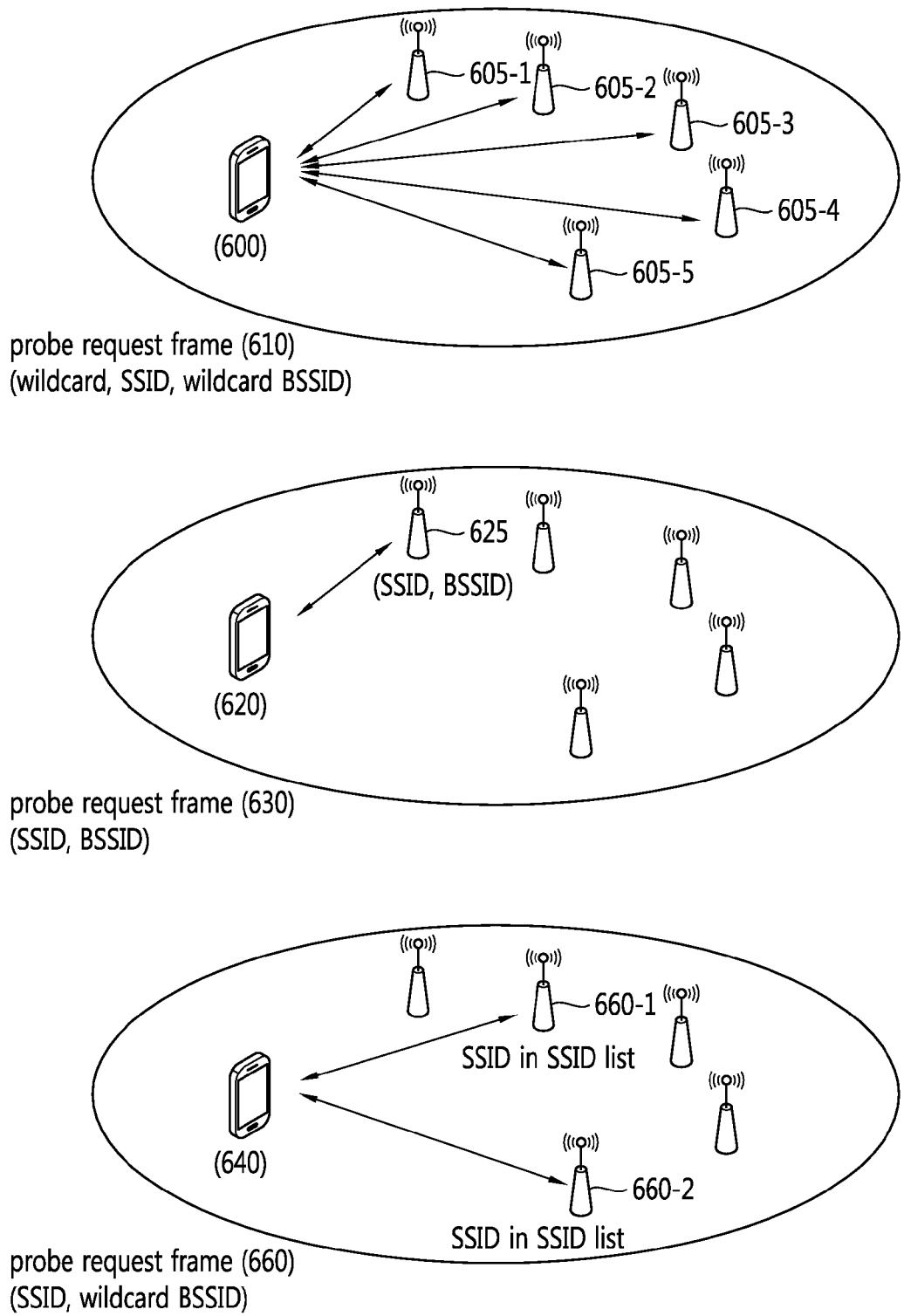
FIG. 6 is a conceptual diagram illustrating a method for transmitting a probe request frame.

FIG. 6 is a concept view illustrating a probe request frame transmission method.

FIG. 6 discloses methods of broadcasting, multicasting, and unicasting probe request frames from an STA.

The upper part of FIG. 6 shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 606-1, 606-2, 606-3, 606-4, and 606-6 included in the transmission range of the STA 600.

TABLE 1

| name | description |
| --- | --- |
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingSeviceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

In case the STA 600 transmits the probe request frame 610 with the wildcard SSID and the wildcard BSSID included in the probe request frame 610, the APs 606-1, 606-2, 606-3, 606-4, and 606-6 that have received the probe request frame 610 from the STA 600 may send probe response frames to the STA 600 in response to the received probe request frame.

In case the APs 606-1, 606-2, 606-3, 606-4, and 606-6 that have received the broadcast probe request frame 610 send the probe response frames to the STA 600 in response to the received probe request frame 610 within a predetermined time, the problem may occur that the STA 600 should simultaneously receive and process too many probe response frames.

The middle part of FIG. 6 shows a method in which the STA 620 unicasts the probe request frame 630.

Referring to the middle part of FIG. 6, in case the STA 620 unicasts the probe request frame 630, the STA 620 may transmit the probe request frame 630 containing particular SSID/BSSID information of the AP. Among the APs that receive the probe request frame 630, only the AP 626 corresponding to the SSID/BSSID specified by the STA 620 may transmit a probe response frame to the STA 620.

The lower part of FIG. 6 shows a method in which the STA 640 multicasts the probe request frame 660.

Referring to the lower part of FIG. 6, the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

Figure 7:
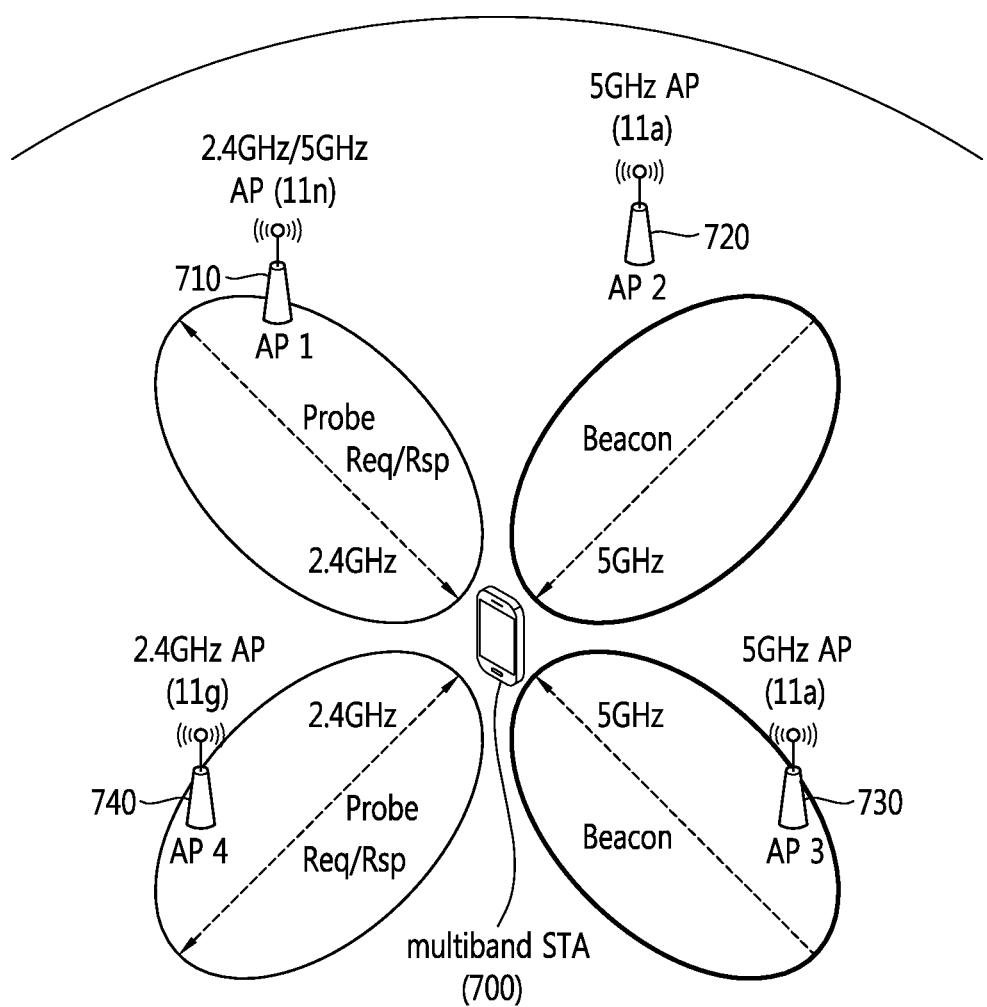
FIG. 7 is a conceptual diagram illustrating a method in which an STA supporting multibands discovers the AP.

FIG. 7 is a conceptual view illustrating a method for discovering an AP by an STA supporting multiple bands.

Referring to FIG. 7, it is assumed that APs supporting a single band and multiple bands coexist around an STA 700 supporting multiple bands. A process in which an STA senses a channel to discover an AP may be performed as follows. Hereinafter, in an embodiment of the present invention, a band may indicate a reference frequency (e.g., a channel starting frequency) generating a channel, and a channel may indicate a frequency band divided to have a predetermined channel spacing on the basis of a band. For example, a plurality of channels may be defined to have a channel spacing of 40 MHz, respectively, by using a frequency of approximately 2.4 GHz as a starting frequency. Hereinafter, the 2.4 GHz may be referred to as a band, and a frequency range divided by 40 MHz based on 2.4 GHz may be referred to as a channel. Supporting multiple bands by an STA or an AP means that an STA or an AP may operate in channels defined in a plurality of bands. Supporting a single band by an STA or an AP means that an STA or an AP may operate in a channel defined in a single band.

Referring to FIG. 7, an STA 700 supporting multiple bands may scan each channel with respect to a 2.4 GHz band and a 5 GHz band to select an optimal AP and may be associated with the selected AP. The STA 700 may perform active scanning in the 2.4 GHz band channel and perform passive scanning in a 5 GHz band channel.

The STA 700 may sequentially perform scanning to discover an AP in the channels of the 2.4 GHz and 5 GHz. The STA 700 may transmit a probe request frame to a first AP 710 and a fourth AP 740 operating in the 2.4 GHz through the 2.4 GHz band. The first AP 710 and the fourth AP 740 may transmit a probe response frame, respectively, in response to the probe request frame transmitted from the STA 700.

Thereafter, the STA 700 receives beacon frames transmitted from a second AP 720 and a third AP 730 operating in the 5 GHz band, and perform passive scanning on the basis of the received beacon frames.

The STA 700 supporting multiple bands may discover target APs by scanning all the channels of the multiple bands. Hereinafter in an embodiment of the present invention, an AP, which is scanned by the STA 700 or with which the STA 700 intends to be associated, will be defined as a term of a 'target AP'. For example, a target AP may be an AP specified by information (e.g., SSID and/or BSSID information) for specifying an AP included in a MLME-SCAN.request primitive.

In the case in which the STA 700 performs scanning according to the method illustrated in FIG. 7, since the STA 700 should search channels included in all the bands in performing scanning, delay may occur in performing scanning.

Hereinafter, in an embodiment of the present invention, a method of performing AP discovery faster than the related art method, in performing a scanning procedure by an STA supporting multiple bands in a WLAN environment supporting multiple bands will be described. In an embodiment of the present invention, it is assumed that each AP has information regarding an access load state of neighbor APs or information regarding as to whether each AP can accommodate an access of an STA. For example, information regarding an access load state of neighbor APs or information regarding as to whether each AP can accommodate an access of an STA may be information transmitted to each AP through an interface defined between APs or higher layer information or may be information reported from an STA.

Also, 2.4 GHz and 5 GHz mentioned in an embodiment of the present invention hereinafter are examples of different frequency bands in which an AP or an STA operate. Any other frequency band may also be included in the scope of the present invention. Also, an embodiment of the present invention may also be applied to an AP or an STA operating in different frequency bands (three or more different frequency bands) greater than two frequency bands, other than two frequency bands.

Hereinafter, the 2.4 GHz band may be defined to be used as a term of a first band, the 5 GHz band may be defined to be used as a term of a second band, an AP operating in the 2.4 GHz band may be defined to be used as a term of a first band AP, and an AP operating in the 5 GHz band may be defined to be used as a term of a second band AP.

Figure 8:
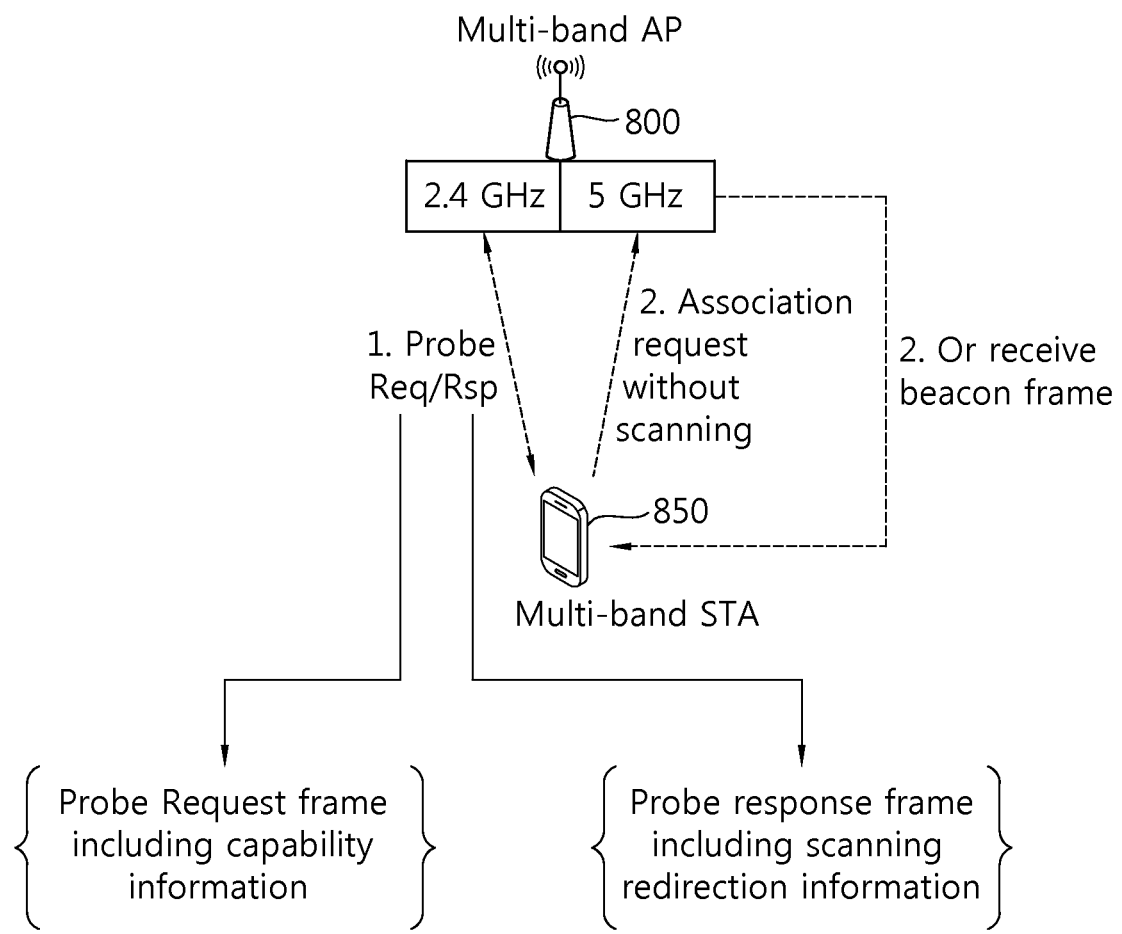
FIG. 8 is a conceptual diagram illustrating a method in which the STA performs scanning in a plurality of channels according to an embodiment of the present invention.

FIG. 8 is a conceptual diagram illustrating a method in which the STA performs scanning in a plurality of channels according to an embodiment of the present invention.

FIG. 8 discloses a case in which an STA 850 supporting multibands transmits a probe request frame to an AP 800 supporting the multibands through a first band.

The probe request frame transmitted by the STA 850 may include information on the band supported by the STA 850. For example, the information on the band supported by the STA 850 may include capability information of the probe request frame. For example, in the case of the capability information, the information on the band supported by the STA 850 may be transmitted to the AP 800 based on a multiband capability indication bitmap.

The AP 800 may induce scanning band switching to not a current band but another band to switch a band which is scanned. For example, the AP 800 may transmit scanning AP readjustment information included in a probe response frame to the STA 850. The scanning AP readjustment information may be information for immediately transmitting an authentication request frame or an association request frame through not the band to transmit the probe request frame but another band. For example, when the STA 850 receives information included in the probe response frame through a first band, the STA 850 may perform authentication and association procedures without receiving the probe response frame through a scanning procedure in a second band. Further, the scanning readjustment information may be information for the STA 850 to perform the scanning procedure through another band. When the scanning AP readjustment information is information for the STA 850 to immediately perform the authentication procedure or the association procedure in another band, the STA 850 may immediately perform the authentication procedure or the association procedure without performing a separate scanning procedure in another band.

According to the embodiment of the present invention, the AP 800 does not perform the scanning procedure in the second band (for example, 5 GHz) and the AP 800 in the first band may transmit the probe response frame including the scanning AP readjustment information to the STA 850 in order to immediately transmit an association request frame through the second band. For example, the AP 800 may decide whether to permit an access by an additional STA in the first band based on BSS load information in the first band (for example, 2.4 GHz). When the AP 800 determines that the access by the additional STA may not be permitted in the first band, the AP 800 may transmit the probe response frame including the scanning AP readjustment information to the STA 850. The STA 850 may perform the association procedure in the second band by transmitting the association request frame through not the band to the probe request frame but another band based on the scanning readjustment information.

For example, the scanning AP readjustment information may include second band channel information (an operating class and a channel list), a transmission (TX) requirement (for example, transmission power, and the like) in the second band, a regulatory requirement in the second band, a quite element, a channel switch announcement element, an the like.

The regulatory requirement in the second band may include, for example, the following regulatory requirement in detail. 1) When a specific channel is used to sense existence of radar transmission according to the regulatory requirement, the STA does not perform transmission in a corresponding channel and 2) when the STA operates in the specific channel and the STA discovers an operation of a radar in an operation channel or when another STA acquires a result of discovering the radar operation in the operation channel, the transmission by the STA is stopped according to the regulatory requirement.

Figure 9:
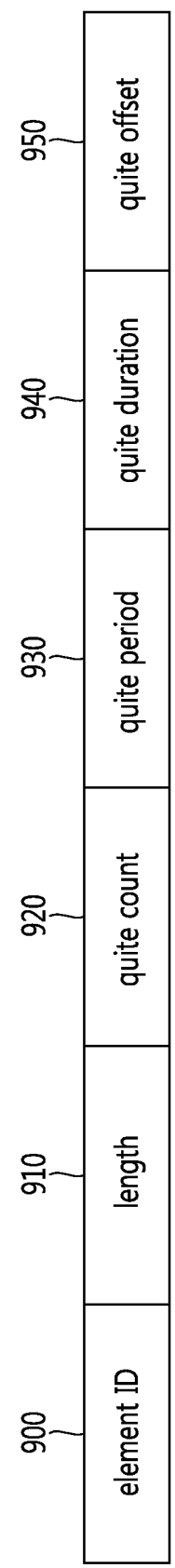
FIG. 9 is a conceptual diagram illustrating a format of a quiet element according to an embodiment of the present invention.
Figure 10:
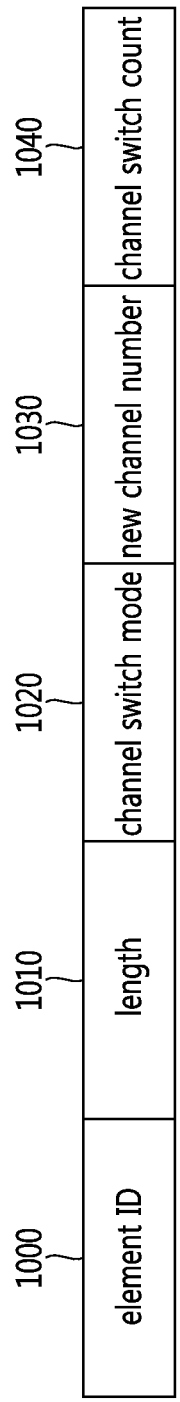
FIG. 10 is a conceptual diagram illustrating a format of a channel switch announcement element according to an embodiment of the present invention.

The quite element and the channel switch announcement element are disclosed in FIGS. 9 and 10.

FIG. 9 is a conceptual diagram illustrating a format of a quiet element according to an embodiment of the present invention.

Referring to FIG. 9, the format of the quiet element may include an element ID 900, a length, 910, a quite count 920, a quiet period 930, a quiet duration 940, and a quiet offset 950.

The element ID 900 may include identifier in formation indicating the quiet element.

The length 910 may include information on the length of the quiet element. For example, the quiet element may be information having a length of 6 octets.

The quiet count 920 may be expressed as the number of TBTTs up to a beacon interval at which a next quiet interval starts. When a value of the quiet count 920 is 1, 1 may indicate that the quiet interval may indicate starts during a beacon interval at which a next TBTT starts and a value of 0 may be a conserved value.

The quiet period 930 may be set as the number of beacon intervals among starts of regularly scheduled quiet intervals determined by the quiet element. The value of 0 may indicate that a periodic quiet interval is not defined.

The quiet duration 940 is set as a duration of the quiet interval and expressed by the unit of TU.

The quiet offset 950 is set as an offset for the start of the quiet interval from a TBTT specified by the quiet count 920 and expressed by the unit of TU. A value of the quiet offset 950 may be smaller than one beacon interval.

FIG. 10 is a conceptual diagram illustrating a format of a channel switch announcement element according to an embodiment of the present invention.

The channel switch announcement element may be used an AP of a BSS, an STA of an IBSS, or a mesh STA of a mesh basic service set (MBSS). When a change to a new channel or to No. of the new channel occurs, the channel switch announcement element may be used to announce the change.

Referring to FIG. 10, the format of the channel switch announcement element may include an element ID 1000, a length 1010, a channel switch mode 1020, a new channel number 1030, and a channel switch count 1040.

The channel switch mode 1020 may indicate predetermined limitation in transmission up to a channel switch. The AP of the BSS and the STA of the IBSS may set the channel switch mode to 0 or 1 in the transmission. A channel switch mode is reserved in the MBSS.

The new channel number 1030 may be set as No. of a channel through which the STA moves.

The STA transmits the association request frame to the AP without performing active scanning or passive scanning in the second band by verifying information included in the probe response frame to maximally reduce a delay for band adjustment.

The operation in one AP supporting the multibands is described as an example in FIG. 8, but the scanning and association procedures may be performed by the same method even in a wireless LAN system constituted by AP supporting different bands.

Figure 11:
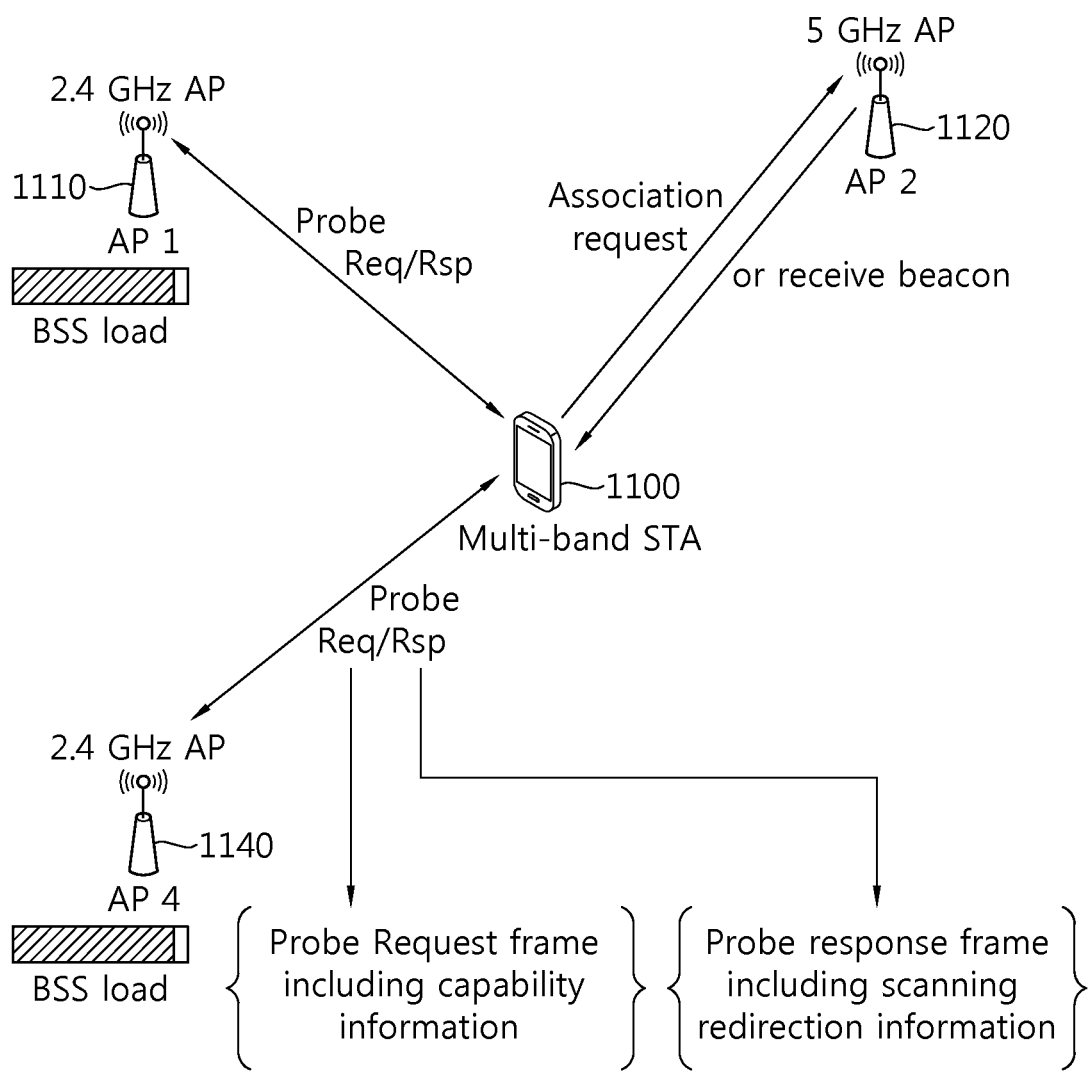
FIG. 11 is a conceptual diagram illustrating a method in which the STA performs scanning in a plurality of channels according to an embodiment of the present invention.

FIG. 11 is a conceptual diagram illustrating a method in which the STA performs scanning in a plurality of channels according to an embodiment of the present invention.

Referring to FIG. 11, it may be assumed that a first AP 1110 and a fourth AP 1140 supporting the first band exist and a second AP 1120 supporting the second band exists.

The STA 1100 may transmit the probe request frame to the first AP 1110. The probe request frame transmitted by the STA 1100 may include information on the band supported by the STA 1100. For example, the probe request frame transmitted by the STA 1100 may include information indicating that the STA 1100 may support the second band.

The first AP 1110 may determine a capacity to accommodate the access by the additional STA in the first band based on BSS load information of the first band. As a result of the determination, when there is no capacity to accommodate the access by the additional STA in the first band, the first AP 1110 may transmit the probe response frame including the scanning AP readjustment information to the first band.

The STA 1100 does not perform the scanning procedure in the second band (for example, 5 GHz) and the first AP 1110 that operates in the first band may transmit the scanning AP readjustment information to the STA 1100 in order to immediately transmit the association request frame through the second band. The STA 1100 may immediately perform association with the second AP 1120 which is a second band AP based on the received scanning AP readjustment information.

For example, the scanning AP readjustment information may include second band channel information (an operating class and a channel list), a transmission (TX) requirement (for example, transmission power, and the like) in the second band, a regulatory requirement in the second band, a quite element, a channel switch announcement element, and the like.

Figure 12:
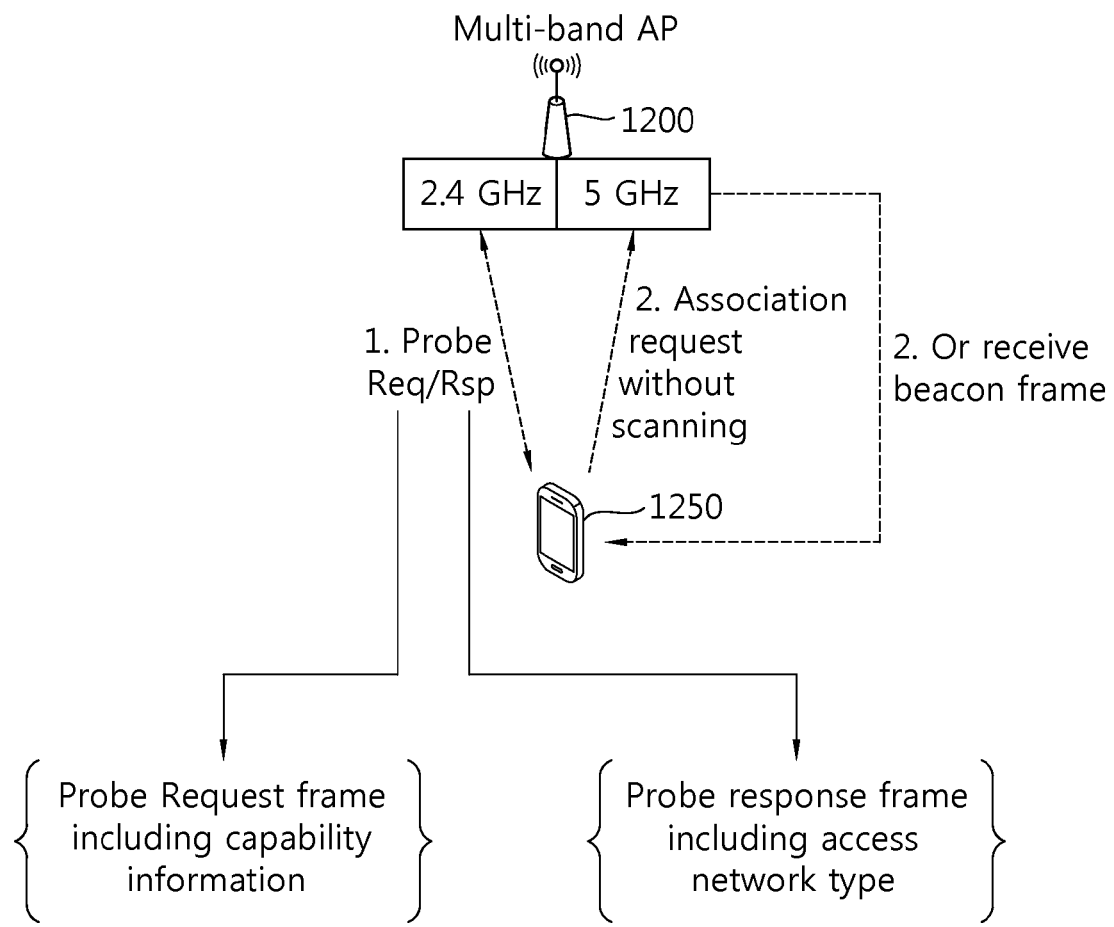
FIG. 12 is a conceptual diagram illustrating a method for scanning by an STA according to an embodiment of the present invention.

FIG. 12 is a conceptual diagram illustrating a method for scanning by an STA according to an embodiment of the present invention.

Referring to FIG. 12, a multiband AP 1200 may transmit a scanning frame including information on another frequency band (for example, 5 GHz) and information on an access network type of a neighboring AP through a first frequency band (for example, 2.4 GHz). The access network type may include information on a network characteristic of the neighboring AP. The access network type will be described below. An STA 1250 may receive the scanning frame and performs the scanning AP readjustment. The scanning frame may the probe response frame, the beacon frame, or an FILS discovery frame. Hereinafter, in the embodiment of the present invention, the neighboring AP is a term indicating an AP that performs scanning but another AP. Even the multiband AP 1200 that is physically positioned at the same location may be included in the neighboring AP when the AP operates in another band. As described above, the STA 1250 may receive the scanning frame including information on another frequency band and the access network type of the neighboring AP and immediately perform the authentication and association procedures without performing the scanning procedure in the corresponding frequency band. Hereinafter, in the embodiment of the present invention, the description will be made on the assumed that the scanning frame is received and a scanning procedure is again performed with respect to a readjusted scanning band, scanning channel or scanning AP for easy description.

Further, FIG. 12 discloses a method for readjusting the frequency band in which the STA receives and the STA 1250 operates to another frequency band and readjusting the scanning AP by considering the access network type of the neighboring AP for easy description. However, according to the embodiment of the present invention, the frequency band may be readjusted to another band based on the information included in the scanning frame and the STA 1250 may readjust the scanning AP to a neighboring AP that operates in another channel in the same band or another neighboring AP that operates in the same channel based on the information included in the scanning frame. For example, an operation may be performed, in which the STA 1250 readjusts a current channel to another channel based on the neighboring AP information element included in the scanning frame and readjusts the scanning AP based on the access network type of the neighboring that operates in the corresponding channel. Further, an operation may be performed, in which the STA 1250 readjusts the scanning AP to the neighboring AP in the same channel based on the neighboring AP information element included in the scanning frame.

Information on the frequency band and the channel included in the neighboring AP information of the scanning frame transmitted by the AP 1200 may be selectively included according to the frequency band and the channel which the AP 1200 intends to readjust. For example, the information on the frequency band to be readjusted by the STA may be included in the scanning frame when the AP 1200 wants to readjust the scanning AP to the neighboring AP that operates in another frequency band.

Referring to FIG. 12, for example, when a load in a specific band (for example, 2.4 GHz) does not have a capacity to accommodate a new STA, the multiband AP 1200 may transmit the scanning frame for the purpose of readjusting the STA to another frequency band (for example, 5 GHz). FIG. 12 discloses a method for readjusting the operating frequency band of the STA 1250 from the 2.4 GHz band to 5 GHz band, but the STA 1250 may readjust the operating frequency band of the STA 1250 from 5 GHz to 2.4 GHz.

The STA 1250 may acquire information on the neighboring AP that operates in the readjusted frequency band and the information on the access type of the neighboring AP based on the neighboring AP information element of the scanning frame transmitted by the AP 1200. The STA 1250 may decide which neighboring AP the scanning procedure is performed with respect to or whether the scanning procedure is performed with respect to the neighboring AP by considering the access type of the AP that operates in the readjusted frequency band.

For example, the STA 1250 may decide whether to scan the neighboring AP based on an access network type to be accessed and the access network type of the neighboring AP acquired based on the scanning frame. For example, the access network type of the neighboring AP acquired based on the scanning frame received by the STA 1250 may be different from the access network type of the target AP. In this case, the STA 1250 may not transmit the probe request frame to the neighboring AP. When the STA 1250 performs the passive scanning, additional decoding may not be performed with a beacon frame and an FILS discovery frame transmitted by a neighboring AP having an access network type different from the access network type of the target AP. By using such a method, the STA may not perform a neighboring AP having an access type which does not match an access type thereof, and as a result, the STA 1250 may terminate the scanning procedure of the neighboring AP.

Figure 13:
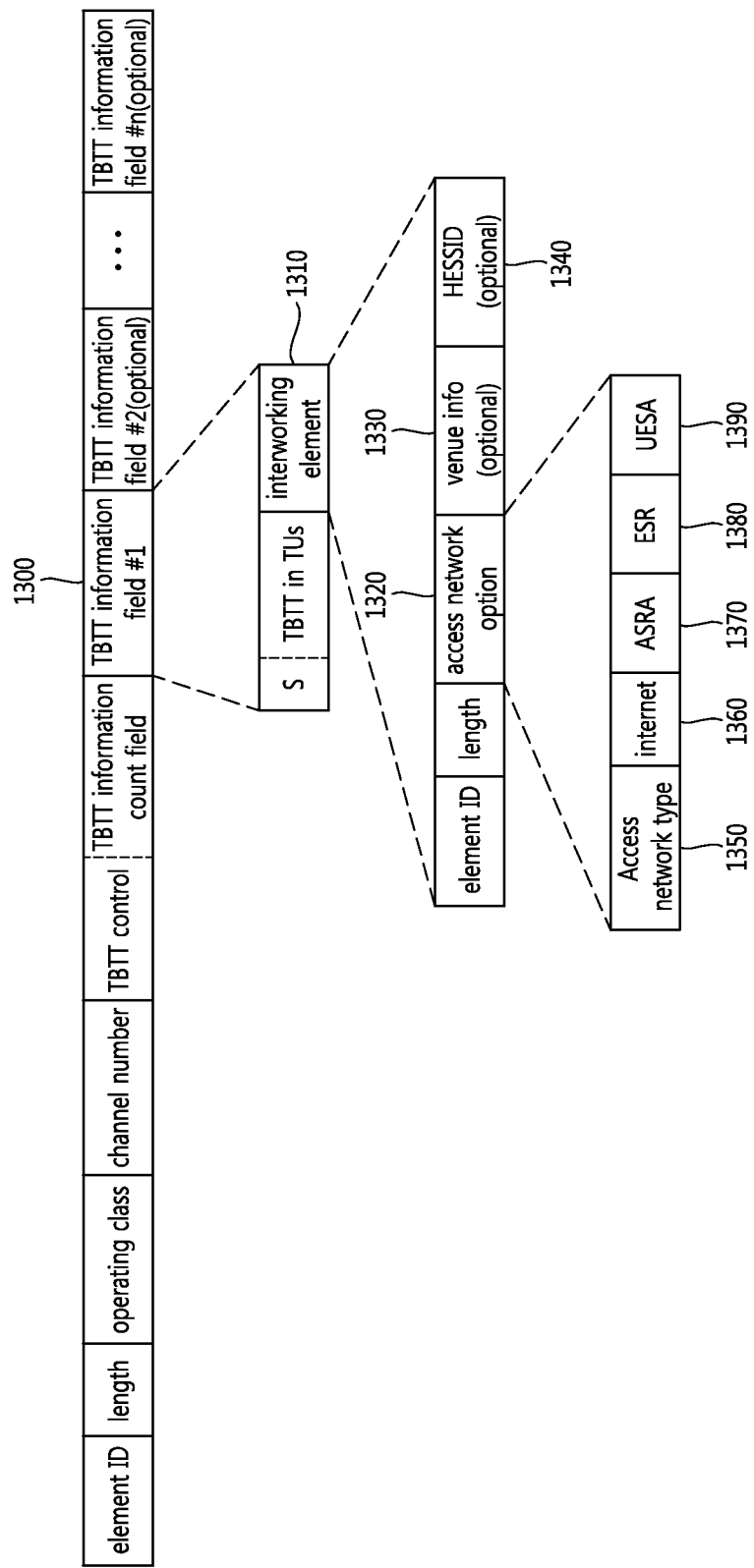
FIG. 13 is a conceptual diagram illustrating an information element included in a scanning frame according to an embodiment of the present invention.

FIG. 13 is a conceptual diagram illustrating an information element included in a scanning frame according to an embodiment of the present invention.

FIG. 13 discloses a neighboring AP information element included in a scanning frame.

For example, the neighboring AP information element may include fields including an operating class, a channel number, a TBTT control, a TBTT information count, and TBTT information.

The operating class may include information on a frequency band which the STA will readjust and scan.

The channel number may include information on a frequency channel which the STA will readjust and scan. The channel number may include information on a specific operation channel number which the STA will scan.

The TBTT control may include information regarding whether an AP corresponding to TBTT reported in the neighboring AP information element is an AP positioned at the physically same location thereas. For example, the AP (BSS) corresponding to the TBTT reported in the neighboring AP information element is a BSS positioned at the physically same location thereas, the TBTT control may be set to 1. When the AP corresponding to TBTT reported in the neighboring AP information element is the AP positioned at the physically same location thereas, the TBTT control may be set to 0 and a TBTT information field for another AP may be included in the neighboring AP information element.

The TBTT information count may include information on the number of TBTT information( ) included in the neighboring AP information element.

The TBTT information 1300 may include the TBTT and an interworking element 1310.

The TBTT may include information on TBTT of an AP that operates in a channel indicated by the channel number.

The interworking element 1310 may include information on an interworking service capability of the AP. For example, the interworking element 1310 may include an access network option 1320.

The access network option 1320 may include information on an access network type 1350. Even when the STA discovers the neighboring AP through the scanning, the AP may not access the initial channel in the case where the AP is the access network type which may not be accessed by the STA. For example, since the access network type of the AP is a private network, it is impossible for the STA to perform the scanning According to the embodiment of the present invention, the AP may provide information on an access network type of the neighboring AP to the STA. The STA may decide whether to perform a scanning operation of the neighboring AP based on the information on the access network type of the neighboring AP, which is included in the neighboring AP information element.

Table 2 given below is a table exemplarily showing the access network type.

TABLE 2

| Access network type | Meaning | Description |
|---|---|---|
| 0 | Private network | Non-authorized users are not permitted on this network. Examples of this access network type are home networks and enterprise networks, which may employ user accounts. Private networks do not necessarily employ encryption. |
| 1 | Private network with guest access | Private network but guest accounts are available. Example of this access network type is enterprise network offering access to guest users. |
| 2 | Charged public network | The network is accessible to anyone, however, access to the network requires payment. Further information on types of charges may be available through other methods (e.g., IEEE 802.21, http/https redirect or DNS redirection). Examples of this access network type is a hotspot in a coffee shop offering internet access on a subscription basis or a hotel offering in-room internet access service for a fee. |

Referring to Table 2, the access network type 1350 of the neighboring AP may be indicated based on a value of the access network option 1320 included in the interworking element 1310 transmitted by the AP. The STA may decide an AP that will perform the scanning based on the access network type 1350 of the neighboring AP. In Table 2, another access network type may be defined as one example.

The access network 1320 may also include fields including the Internet 1360, an additional step required for access 1370, emergency services reachable 1380, and an authenticated emergency service accessible 1390.

The Internet 1360 included in the access network option 1320 may include information on whether a network provides connectivity to the Internet. When the network provides the connectivity to the Internet, the AP or the mesh STA may set the Internet field to 1. When the AP or the mesh STA sets the Internet field to 0, the corresponding Internet field indicates that it is not disclosed whether the network provides the connectivity to the Internet.

The ASRA 1370 may include information regarding whether an additional step is required to access the network.

The ESR 1380 may include information on whether to reach an emergency service through the AP.

The UESA 1390 may include information on whether to reach an unauthorized emergency service.

The interworking element 1310 may also include venue information 1330 and an HESSID 1340.

The venue information 1330 may include information on a venue in which the wireless LAN is implemented.

The HESSID 1340 may include information on a homogeneous ESS identifier (HESSID). The HESSID may be an identifier regarding homogeneous ESS.

The interworking element 1310 may be included in the neighboring AP information element in various information formats. For example, the interworking element 1310 may be allocated with identifier information as one subelement among subelements included in the TBTT information. For example, Table 3 given below is a table that shows the subelements included in the TBTT information 1300.

TABLE 3

| Subelement ID | Name | Length field (octets) | Extensible |
|---|---|---|---|
| 0 | Interworking | | |
| 1-225 | Reserved | | |

Referring to Table 3, the interworking element may be allocated to one subelement identifier, 0 among the subelements included in the TBTT information 1300.

Further, according to the embodiment of the present invention, interworking elements for a plurality of neighboring APs may be included in not TBTT information for each neighboring AP but specific TBTT information.

Figure 14:
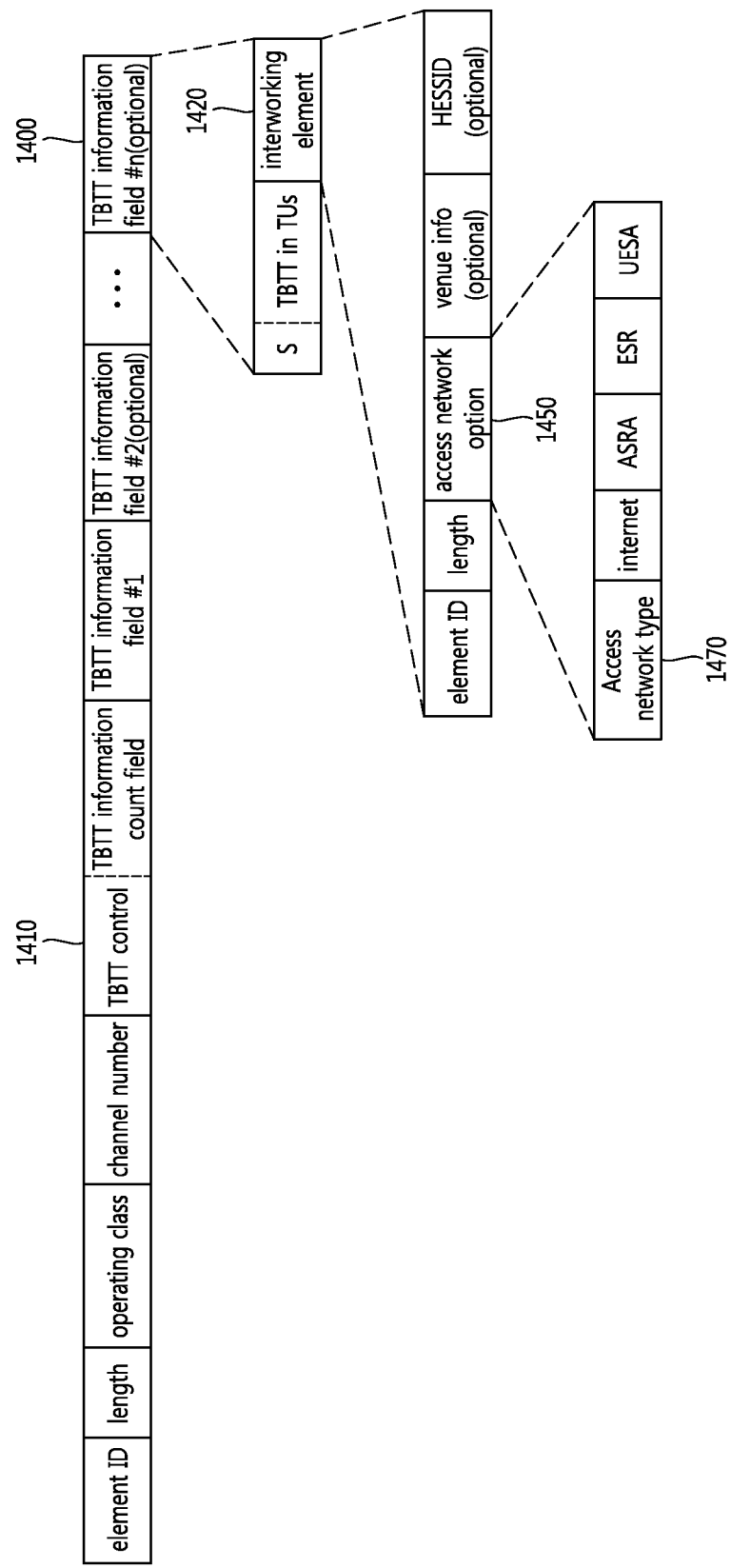
FIG. 14 is a conceptual diagram illustrating a neighboring AP information element according to an embodiment of the present invention.

FIG. 14 is a conceptual diagram illustrating a neighboring AP information element according to an embodiment of the present invention.

Referring to FIG. 14, TBTT information of the number indicated by the TBTT information count 1410 may be included in the neighboring AP information element. According to the embodiment of the present invention, all of the respective interworking elements for the neighboring APs may be transmitted with being included in the specific TBTT information 1400. For example, the interworking element 1420 corresponding to the number (that is, a value of the TBTT information count) of the TBTT information may be included in the last TBTT information 1400. The STA may acquire the information on the access network type 1450 for the neighboring AP based on the interworking element 1420 included in the last TBTT information 1400 of the neighboring AP information element included in the scanning frame. Correspondence relationships of the plurality of interworking elements 1420 included in the last TBTT information 1400 and the plurality of neighboring APs may be set by various methods. For example, the identifier information of the AP and the interworking element 1420 may be mapped to each other based on the identifier information of the AP or the STA may be set to acquire the correspondence relationship between the neighboring AP and the interworking element 1420 based on a bit sequence allocated to encoded or decoded information elements.

FIG. 12 described above illustrates an example of the multiband AP that support a plurality of bands. According to the embodiment of the present invention, even in the case of a plurality of single-band APs that operate in different bands, an another-band AP may readjust the scanning frequency band based on a scanning frame transmitted by a specific-band AP.

Figure 15:
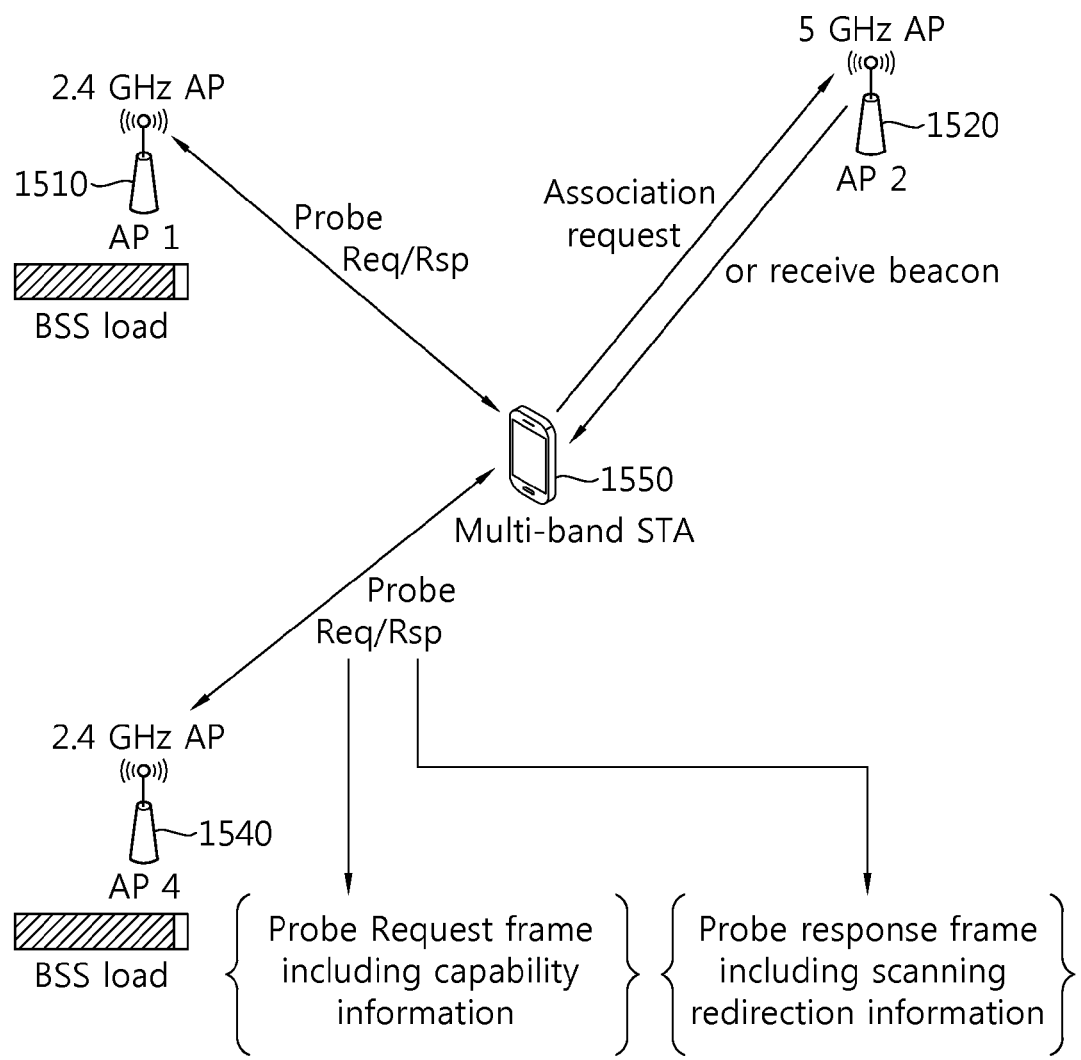
FIG. 15 is a conceptual diagram illustrating a method for readjusting a frequency band by an STA according to an embodiment of the present invention.

FIG. 15 is a conceptual diagram illustrating a method for readjusting a frequency band by an STA according to an embodiment of the present invention.

FIG. 15 discloses a method in which an STA 1550 performs scanning AP readjustment based on one AP that operates in multibands but APs 1510, 1520, and 1540 that operate in different bands.

Referring to FIG. 15, the first AP 1510 that operates in the first band (for example, 2.4 GHz) may transmit the scanning frame including the neighboring AP information element illustrated in FIG. 13 or 14 to the STA 1550. The neighboring AP information element may include information described in FIG. 13 or 14.

TBTT information and access network type information for the second AP 1520 that operates in the second band may be included in the neighboring information element transmitted by the first AP 1510. The STA 1550 may access the second AP 1520 based on the TBTT information and the access type information for the second AP 1520.

According to the embodiment of the present invention, a band identifier is added to the neighboring AP information element to simplify the scanning procedure by the STA.

As disclosed in FIG. 13 described above, the AP may transmit the neighboring AP information element included in the scanning frame. The STA may rapidly scan an AP that operates in another band by acquiring TBTT or channel information of an AP that operates in another frequency band. However, the neighboring AP information element may be selective information element. Further, the neighboring AP information element may not be included every transmission period of the beacon frame or FILS discovery frame and the neighboring AP information element may be transmitted to the beacon frame or the FILS discovery frame at a period which is a multiple of the transmission period. In this case, it may be unclear that the STA determines whether the neighboring AP information element is not included in the scanning frame because the neighboring AP does not exist or whether the neighboring information element is not transmitted because the corresponding period does not correspond to the transmission period of the neighboring AP information element. Further, an AP channel report element transmitted through the beacon frame or the probe response frame in the related art includes only information on the operating class and the channel list for the STA to perform the scanning. Therefore, the STA may not find whether the neighboring AP exists by only AP channel report information.

According to the embodiment of the present invention, the neighboring AP information element may include a band identifier. The band identifier may include information regarding whether the AP that operates in the specific band exists.

Figure 16:
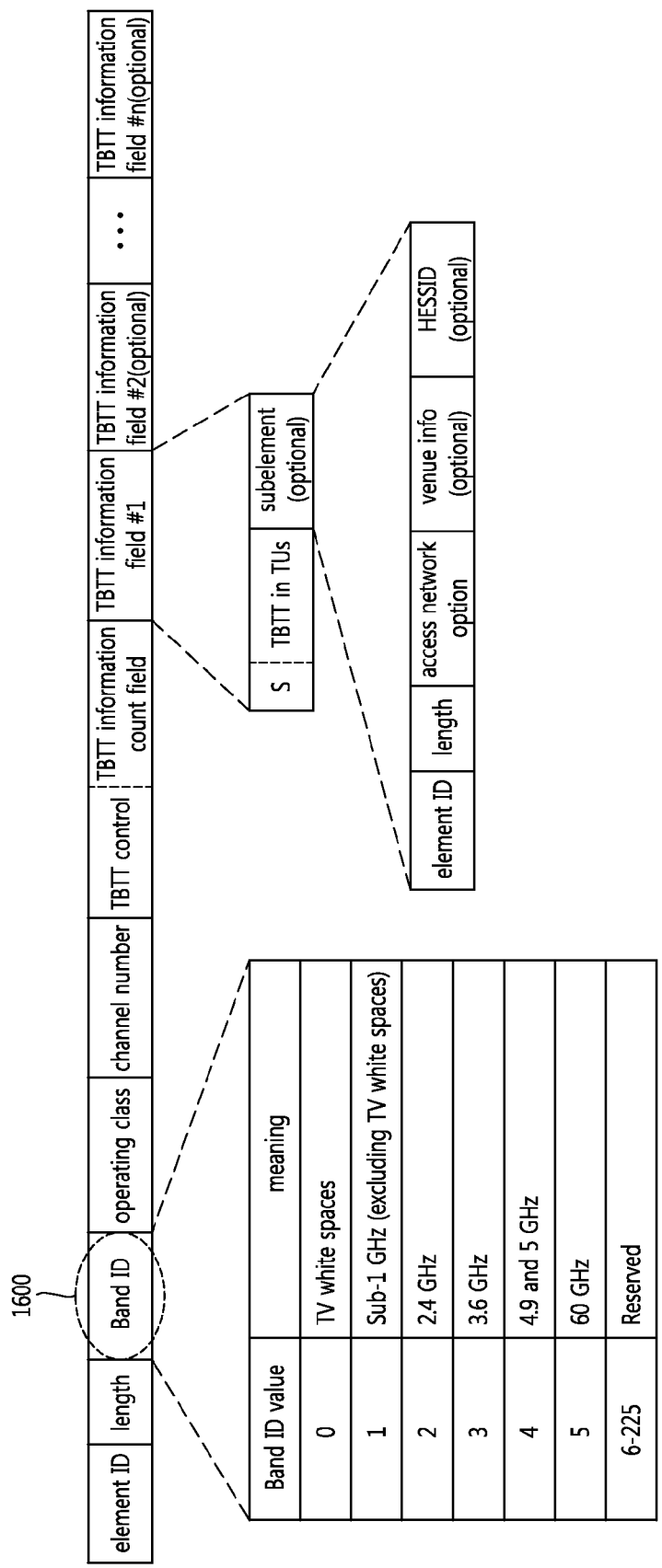
FIG. 16 is a conceptual diagram illustrating a neighboring AP information element according to an embodiment of the present invention.

FIG. 16 is a conceptual diagram illustrating a neighboring AP information element according to an embodiment of the present invention.

FIG. 16 is a conceptual diagram illustrating the neighboring AP information element when the neighboring AP that operates in the specific frequency band exists.

The neighboring AP information element may include a band identifier 1600. The band identifier 1600 may include information on a frequency band in which the neighboring AP operates.

Table 4 given below shows an identifier for a band included in the band identifier 1600 and a frequency band corresponding to each identifier.

TABLE 4

| Band ID value | Meaning |
| --- | --- |
| 0 | TV white spaces |
| 1 | Sub-1 GHz (excluding TV white spaces) |
| 2 | 2.4 GHz |
| 3 | 3.6 GHz |
| 4 | 4.9 GHz and 5 GHz |
| 5 | 60 GHz |
| 6-255 | Reserved |

The band identifier 1600 may include the information on the frequency band in which the neighboring AP operates. When the neighboring AP that operates in the specific frequency band exists, the band identifier 1600 and the TBTT information may be included in the neighboring AP information element. That STA that receives the neighboring AP information element may acquire the information on the frequency band in which the neighboring AP operates and the information (for example, the TBTT and/or access type of the neighboring AP) on the neighboring AP that operates in the corresponding band.

When the neighboring AP does not exist in the specific frequency band, the AP may transmit the scanning frame including the neighboring AP information element including only the band identifier 1600.

Figure 17:
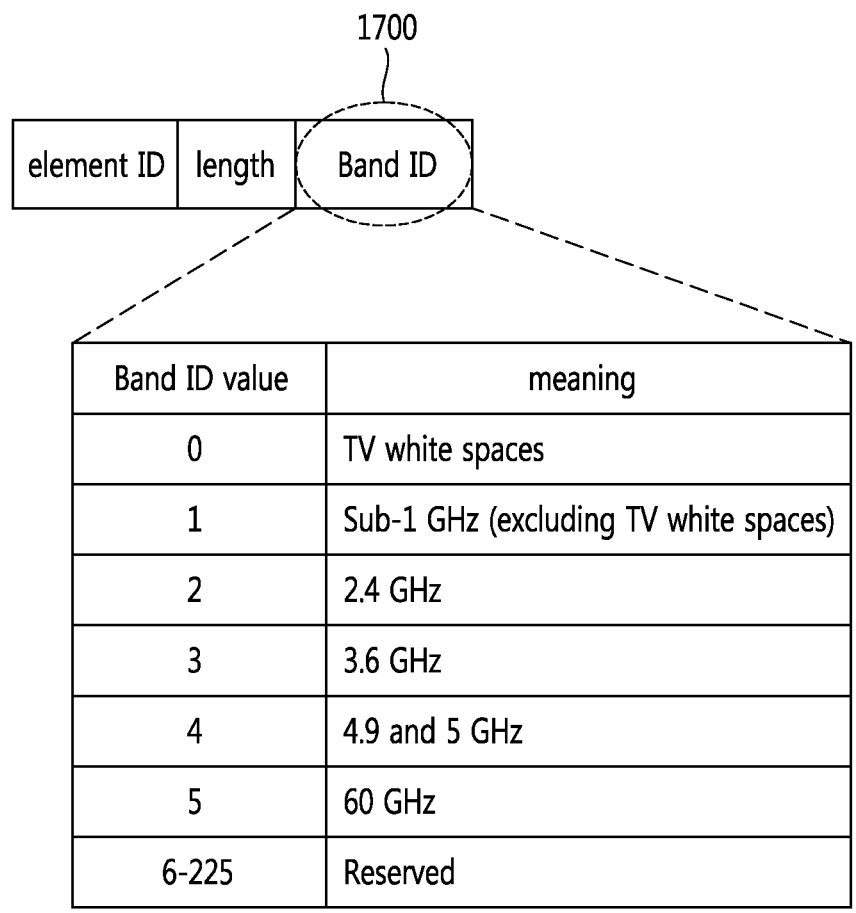
FIG. 17 is a conceptual diagram illustrating a neighboring AP information element according to an embodiment of the present invention.

FIG. 17 is a conceptual diagram illustrating a neighboring AP information element according to an embodiment of the present invention.

FIG. 17 is a conceptual diagram illustrating the neighboring AP information element when the neighboring AP that operates in the specific frequency band does not exist.

The neighboring AP information element may include a band identifier 1700. When the neighboring AP that operates in the specific frequency band does not exist, the information (for example, the TBTT information) on the neighboring AP may not be included in the scanning frame. For example, when the neighboring AP that operates in the 5 GHz frequency band does not exist, the scanning frame may set the band identifier 1700 of the neighboring AP information element to 4 and not include the information on the neighboring AP. The STA that receives the scanning frame may determine that the AP which operates in the 5 GHz frequency band therearound does not exist and not perform scanning for the 5 GHz band. By using such a method, the STA may not unnecessarily perform the scanning procedure in the 5 GHz frequency band.

The frequency band of the neighboring AP and the information on the neighboring AP may be transmitted to the STA based on various frame formats. For example, as a method for the AP to transmit information on 2.4 GHz, 5 GHz, and 60 GHz which are frequency bands and an STA that operates in each frequency band, various methods may be used. For example, the neighboring AP information element may be included in the scanning frame as a separate information element for each frequency band.

The neighboring AP information element may be included in the scanning frame in various information formats. For example, the neighboring AP information element may be transmitted with being included in a vendor specific information element of the scanning frame.

Figure 18:
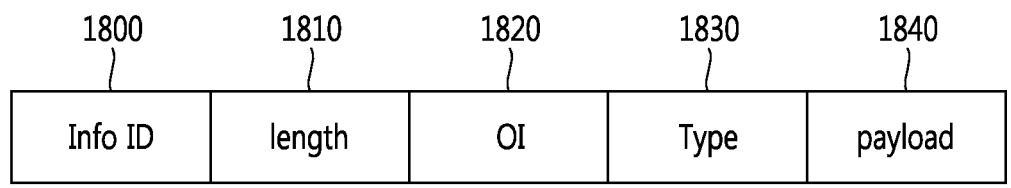
FIG. 18 is a conceptual diagram illustrating a vendor specific information element according to an embodiment of the present invention.

FIG. 18 is a conceptual diagram illustrating a vendor specific information element according to an embodiment of the present invention.

Referring to FIG. 18, the vendor specific information element may include an information ID 1800, a length 1810, an organization identifier 1820, a type 1830, and a payload 1840.

The information ID 1800 may be used to indicate the vendor specific information element.

The length 1810 may include information on the length of a field included in the vendor specific information element.

The organization identifier 1820 may include identifier information allocated to a specific organization.

The type 1830 may include information for indicating the neighboring AP information element for scanning readjustment.

The payload 1840 may include at least one of the information included in the neighboring AP information element defined in FIG. 13 or 14 described above when the type 1830 indicates the neighboring AP information element.

The STA may readjust a scanning AP based on the vendor specific information element included in the scanning frame.

Figure 19:
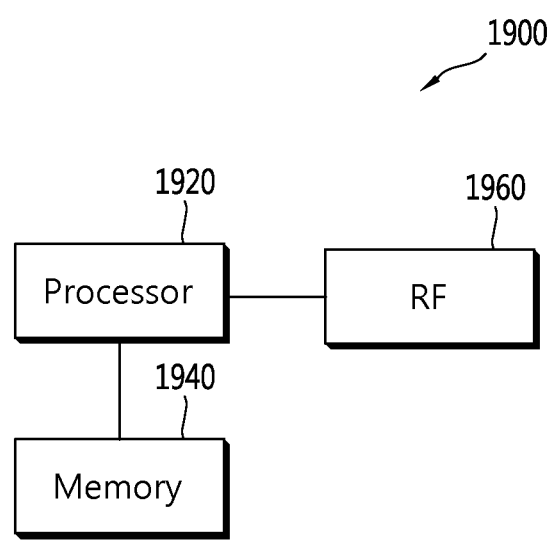
FIG. 19 is a block diagram illustrating a wireless apparatus to which the embodiment of the present invention can be applied.

FIG. 19 is a block diagram illustrating a wireless device to which an embodiment of the present invention may apply.

Referring to FIG. 19, the wireless device 1900 may be an STA that may implement the above-described embodiments, and the wireless device 1900 may be an AP or a non-AP STA (station).

The wireless device 1900 includes a processor 1920, a memory 1940, and an RF (Radio Frequency) unit 1960.

The RF unit 1960 may be connected with the processor 1920 to transmit/receive radio signals.

The processor 1920 implements functions, processes, and/or methods as proposed herein. For example, the processor 1920 may be implemented to perform the operation of the above-described wireless device according to an embodiment of the present invention.

For example, when the wireless apparatus is the AP, the processor 1920 may be implemented to generate and transmit the scanning frame including the access network type.

Further, when the wireless apparatus is the STA, the processor 1920 may be implemented to receive the scanning frame including the neighboring AP information element including the information on the second band which is the operating band of the neighboring AP from the multiband access point through the first band and determine whether to access the neighboring AP based on the information on the access network type of the neighboring AP that operates in the second band included in the neighboring AP information element. In addition, when the processor 1920 may access the neighboring AP, the processor 1920 may be implemented to transmit the association request frame to the neighboring AP through the second band. The access network type may include information on an access permission type of the neighboring AP.

The processor 1920 may include an ASIC (Application-Specific Integrated Circuit), other chipset, a logic circuit, a data processing device, and/or a converter that performs conversion between a baseband signal and a radio signal. The memory 1940 may include a ROM (Read-Only Memory), a RAM (Random Access Memory), a flash memory, a memory card, a storage medium, and/or other storage device. The RF unit 1960 may include one or more antennas that transmit and/or receive radio signals.

When an embodiment is implemented in software, the above-described schemes may be embodied in modules (processes, or functions, etc.) performing the above-described functions. The modules may be stored in the memory 1940 and may be executed by the processor 1920. The memory 1940 may be positioned in or outside the processor 1920 and may be connected with the processor 1920 via various well-known means.

What is claimed is:

1. A method for an initial channel access by a station (STA), the method comprising:
   receiving, by the STA from a multiband access point (AP), a scanning frame including a neighboring AP information element via a first band when the multiband AP determines that the STA is not capable of accessing a channel via the first band,
   wherein the neighboring AP information element includes information on a second band which is an operating band for the neighboring AP and information on an access network type of the neighboring AP;
   determining, by the STA, whether the STA is capable of accessing the neighboring AP based on the information on the access network type of the neighboring AP; and
   transmitting, by the STA, an association request frame to the neighboring AP via the second band when the STA is capable of accessing to the neighboring AP,
   wherein the access network type of the neighboring AP includes information on an access permission type of the neighboring AP.

2. The method of claim 1,
   wherein the access network type is one of a private network, a private network having no restriction to a guest user and a charged public network,
   wherein the private network is a network having a restriction to a non-authenticated user to access the network,
   wherein the private network has no restriction to a guest user permit an access to the guest user, and
   wherein the charged public network has no restriction to access but being charged for accessing.

3. The method of claim 1,
   wherein the scanning frame is one of a beacon frame, a fast initial link setup (FILS) discovery frame, and a probe response frame.

4. The method of claim 1,
   wherein the neighboring AP information element is included in a vendor specific information element of the scanning frame.

5. The method of claim 1, further comprising:
   receiving, by the STA, the scanning frame from the neighboring AP via the second band when the STA is capable of accessing to the neighboring AP,
   wherein the scanning frame is one of a beacon frame, a fast initial link setup (FILS) discovery frame and a probe response frame.

6. A station (STA) operating in a wireless LAN, the STA comprising:
   a transceiver configured to transmit or receive a radio signal; and
   a processor operatively connected with the transceiver and configured to:
      receive, from a multiband access point (AP), a scanning frame including a neighboring AP information element via a first band when the multiband AP determines that the STA is not capable of accessing a channel via the first band,
      wherein the neighboring AP information element includes information on a second band which is an operating band for the neighboring AP and information on an access network type of the neighboring AP;

determine whether the STA is capable of accessing the neighboring AP based on the information on the access network type of the neighboring AP; and transmit an association request frame to the neighboring AP via the second band when the STA is capable of accessing to the neighboring AP, wherein the access network type of the neighboring AP includes information on an access permission type of the neighboring AP.

7. The STA of claim 6, wherein the access network type is one of a private network, a private network having no restriction to a guest user and a charged public network, wherein the private network is a network having a restriction to a non-authenticated user to access the network, wherein the private network has no restriction to a guest user permit an access to the guest user, and wherein the charged public network has no restriction to access but being charged for accessing.

8. The STA of claim 6, wherein the scanning frame is one of a beacon frame, a fast initial link setup (FILS) discovery frame, and a probe response frame.

9. The STA of claim 6, wherein the neighboring AP information element is included in a vendor specific information element of the scanning frame.

10. The STA of claim 6, wherein the processor is configured to receive the scanning frame from the neighboring AP via the second band when the STA is capable of accessing to the neighboring AP, wherein the scanning frame is one of a beacon frame, a fast initial link setup (FILS) discovery frame and a probe response frame.

* * * * *